Dec. 1, 1931.  R. M. GALLOWAY  1,834,694
MECHANISM FOR MACHINING METAL HYDRAULICALLY
Filed May 20, 1926   2 Sheets-Sheet 1

Inventor
Robert M. Galloway
By Attorney
Albert P. Nathan

Inventor
Robert M. Galloway
By Attorney
Albert P. Nathan

Patented Dec. 1, 1931

1,834,694

UNITED STATES PATENT OFFICE

ROBERT M. GALLOWAY, OF RICHMOND, INDIANA

MECHANISM FOR MACHINING METAL HYDRAULICALLY

Application filed May 20, 1926. Serial No. 110,457.

This invention deals with machine-tools of the type wherein the metal is removed from the work in the form of elongated strips (by relative reciprocations between the work and the tool) and the amount of metal removed per stroke, or the width of the strips, is determined by the extent of the relative lateral displacements between the tool and the work, or so-called feed.

The aim is to avoid mechanical complication by eliminating the usual mechanical transmission lines (comprising shafts, gears, clutches, and change-gears) and by accomplishing the feeding, as well as the cutting strokes, solely by a fluid-pressure actuation under the automatic control of a simple valve-system.

Not only are the cutting and feeding strokes performed hydraulically but likewise the regulations of the rates, frequencies, directions, etc. of the motions are made under hydraulic cooperation. Thus, by this invention, the cutting stroke may be regulated easily to any desired length and the location of its end stations may be shifted as desired. The rate of the advance stroke may be nicely varied to attain the maximum cutting efficiency, and the return stroke may be given whatever speed may be compatible with the momentum of the reciprocating parts. So also, the timing of the intermittent feed with relation to the tooling operation may be varied to meet any desires, and the length of each feeding stroke admits of close regulation so that the tool may, at each of its contact periods, remove the full amount of metal justified by the character of the finish desired and the output of the machine.

In planers, the work-support is reciprocated and the tool is held stationary, during the tooling operation, while in slotters and other types, the converse obtains. This invention, applicable to either, need only be described for the latter. In planers, the "feeding" is done by laterally-shifting the tool, while in shapers and analogous types, it is done by laterally shifting the work, and again this invention is equally applicable to either and need be described only through the example of a shaper.

Figure 1:
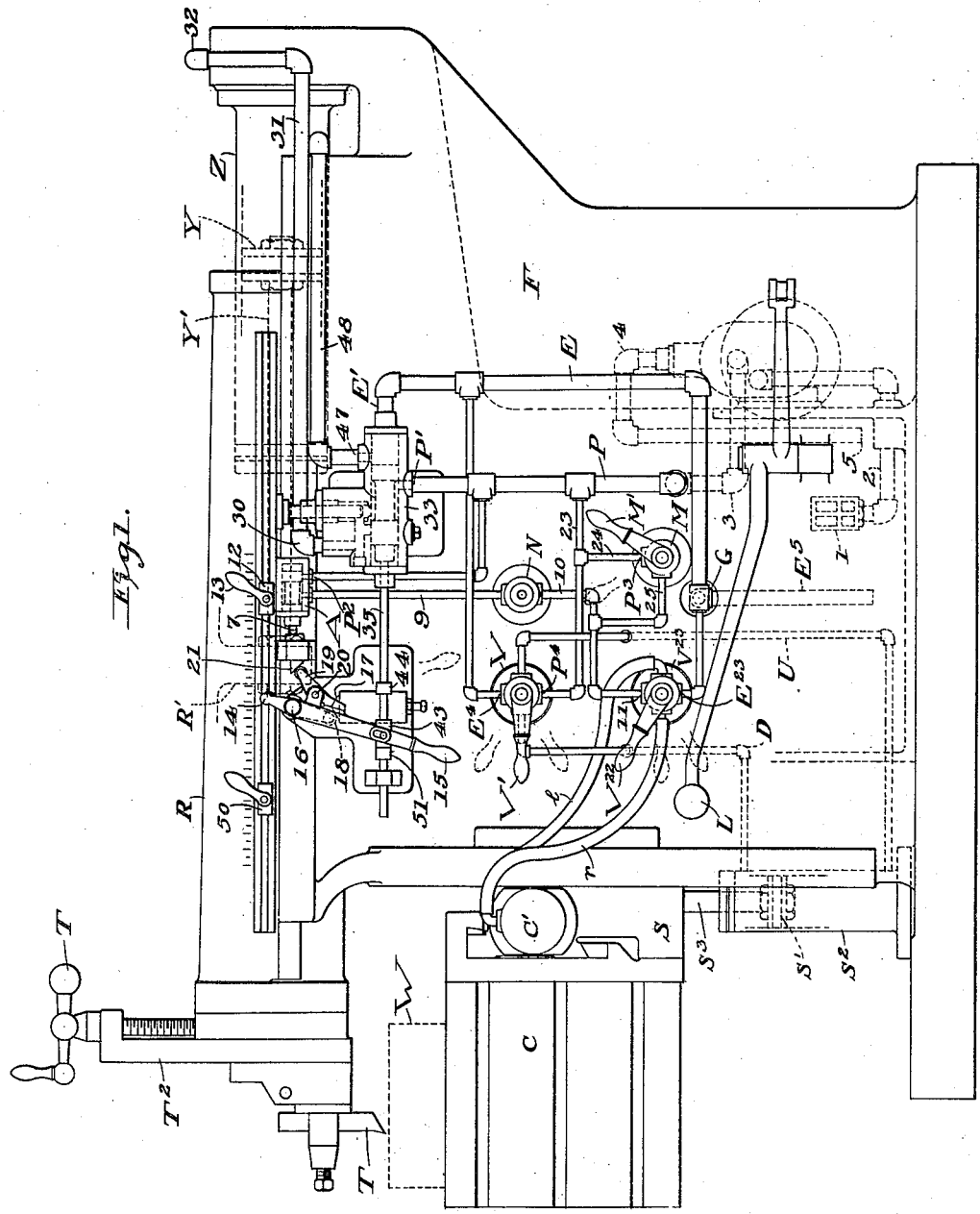
Figure 2:
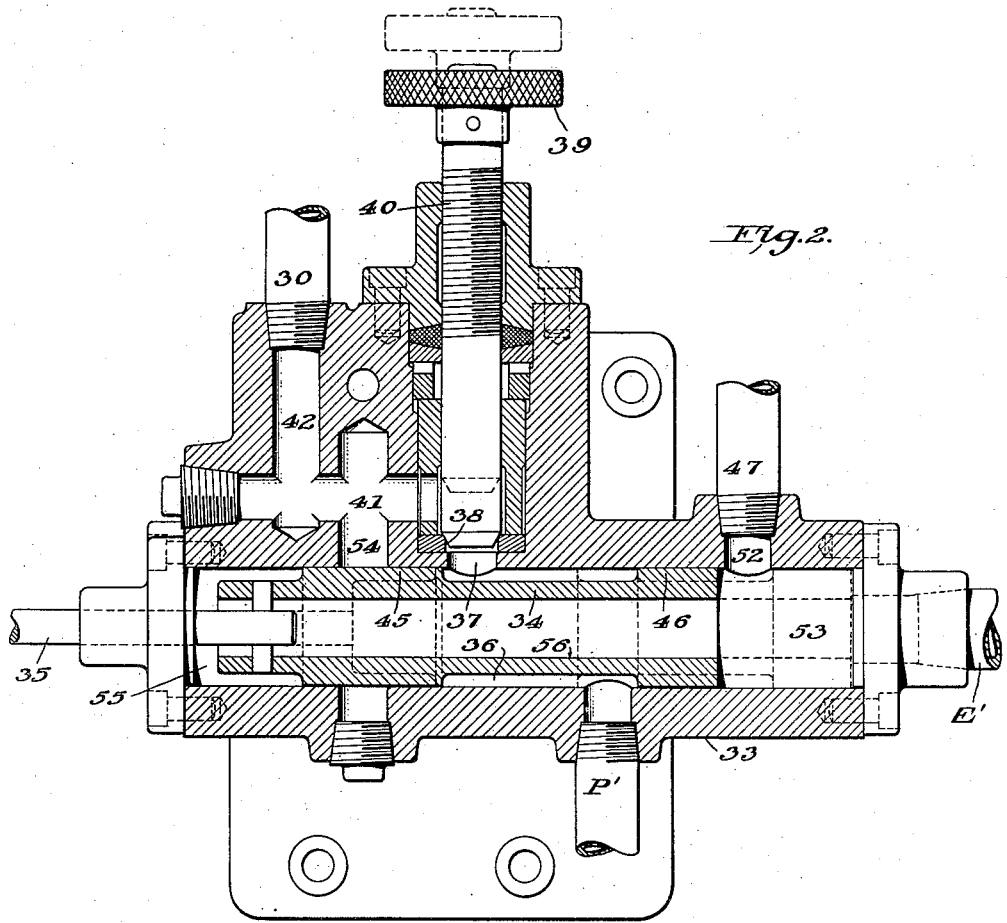
Figure 3:
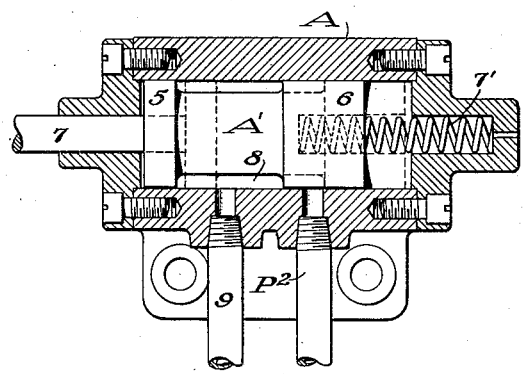

Referring now to the drawings: Figure 1 is a diagrammatic representation of a machine tool of the type known as a shaper embodying this invention. Fig. 2 is a cross section of a valve for causing either the work or the tool carrier, as the case may be, to reciprocate slowly to and rapidly fro. Fig. 3 is a cross section of a periodically operated valve for admitting "shots" of fluid to a cylinder for the purpose of progressively and intermittently advancing one of the carriers of the machine tool.

The energy for performing the periodic movements of a machine tool, according to this conception, is that of a fluid under pressure; oil, for example, being well suitable. This fluid is available for various operations from what may be regarded as a high pressure system of piping represented by P having appropriate outlets $P^1$, $P^2$, $P^3$, and $P^4$. The outlet $P^1$ delivers the oil for performing the cutting stroke and for accomplishing a quick return preparatory to performing the next cutting stroke, etc. The outlet $P^2$ delivers the oil for accomplishing what is commonly termed the "feed". The outlet $P^3$ delivers oil for effecting what is known as the "quick-traverse". The outlet $P^4$ delivers oil for making the preliminary adjustment in the relation between the tool and the work for determining the depth of the cut.

The piping system P initially derives its fluid under pressure from any suitable source, either external of the machine or internal as indicated by Fig. 1, in which a motor driven pump (started and stopped by any suitable lever such as L) draws oil from a reservoir in the base of the machine through a screen 1, a pipe 2, and delivers it through a pipe 3 to the piping P. An overflow pipe 4 terminating at 5 in the reservoir of the machine provides for the overflow of such oil as may not be required in the high pressure piping P. The work indicated by W is supported upon a suitable carriage or carrier C which, in this instance, is in the nature of a table arranged to be progressively advanced or shifted along a saddle S. This saddle is vertically adjustable on the main body casting or frame F of the machine; it being shifted either up or down, as well as held stationary, by a suitable piston $S^1$ within a cylinder $S^2$, an appropriate piston rod $S^3$ connecting the saddle with the piston. To raise the saddle, the oil under pressure is admitted to the lower end of the cylinder and permitted to escape from its upper end, and conversely. Means for doing this comprises a pipe line U and a pipe line D, each leading from a four-way valve V which receives oil under pressure through the pipe terminal $P^4$ and (depending upon the position of the valve handle) admitting the oil under pressure to the line U to move the saddle up, or to the line D to move the saddle down.

An exhaust system of piping, indicated generally by E, provides for the return of the waste oil from the different operative parts of the mechanism to the reservoir or well in the base of the machine. This exhaust system therefore has a terminal $E^4$ through which escapes the oil caused to be expelled by the admission of oil under pressure by the pipe terminal $P^4$, and which likewise provides pipe terminals $E'$ for the escape of the waste oil expelled during the tooling and quick return operations. It also provides a pipe terminal $E^{23}$ for the escape of the oil expelled as a result of the admission of oil either through the pipe terminal $P^2$ to perform the feed or through the pipe terminal $P^3$ to perform the quick traverse. The oil ultimately escapes to the reservoir or well through the drain-pipe $E^5$.

By manually manipulating the valve handle $V'$ into its upper position shown by dotted lines, the saddle and carriage will be raised by hydraulic energy to bring the work W approximately into tooling relation with the reciprocating tool T on the ram R. Thereby the depth of the cut can be approximately determined but, ordinarily, the accurate adjustment of the depth of cut would be made by turning the conventional hand screw $T'$ to shift the tool-head of carrier $T^2$ toward or away from the work the desired distance.

As will be understood, in this type of machine the cutting operation is performed in successive strokes relatively between the work and the tool; in the drawings, it being the tool that is bodily reciprocated to perform the cutting stroke and it being the work that is shifted intermittently to accomplish the feed so that the new strip of work will be presented for each successive advance of the cutting tool. The means for accomplishing this "feed" embodies a piston and cylinder $C'$ (analogous to that shown for raising and lowering the saddle) but set horizontally to conform to the shifting of the work carrier or table C to the right and left side of the machine. This oil is coveyed to the respective ends of this cylinder by means of two flexible (to accommodate the vertical movement of the saddle) pipes $r$ and $l$ and these flexible pipes receive their oil through an agency of a four-way valve $V^{23}$; the oil being admitted either in successive "shots" of predetermined amounts to accomplished the feed or continuously at the full pressure to accomplish the rapid traverse.

The oil is carried to the direction determining valve $V^{23}$ by either one or the other of two branch lines. The first branch line is under the control of a periodically operated valve, and the second branch line under the control of a manually operated valve. The automatic valve, or the first branch line, is shown in detail by Fig. 3 and is indicated generally by A on Fig. 1. It comprises an appropriate housing containing a piston $A'$ of the balanced type, i. e., providing two heads 5 and 6. This piston is normally maintained in the position shown by Fig. 3 by the action of a spring $7'$ and in that position the head 6 closes the entry of the oil under pressure from the pipe terminal $P^2$. A valve stem 7 extends from one end of the casing to the vicinity of a mechanism for automatically shifting the piston $A'$ against the opposition of the spring $7'$. This position is shown by the dotted lines of Fig. 3 and it opens the passage for the oil under pressure from the pipe terminal $P^2$, permitting that oil to flow through the space 8 and into the pipe 9. In series with the pipe 9 is a needle valve N which admits of being regulated or set so as to control the rate at which the oil may flow through the pipe line 9. This needle valve may be of any conventional construction and hence need not be described in detail. From the needle valve, the oil flows through a pipe 10 and ultimately enters the valve $V^{23}$ through a terminal pipe 11. The operation of the valve A is such that "shots" of oil will successively be admitted to the pipe 9 and, after passing the needle valve N and the direction valve $V^{23}$, will enter the cylinder $C'$ and cause the work support to advance intermittently and successively step by step to accomplish the feed.

This intermittent actuation of the valve A is accomplished by any suitable mechanism arranged to be actuated by the periodically movable carrier which, in the example illustrated, is the ram R that carries the tool T. On the ram is an elongated T-slot, or its equivalent, which carries a dog 12 adapted to be clamped at any station by a conventional clamp handle 13. As the ram R advances in making its cutting stroke, the dog 12 ultimately comes in contact with the extremity 14 of a lever 15 pivoted at 16. This lever is thereby swung about its pivot until its occupies a vertical position and thereupon it automatically continues its movement quickly independently of the dog 12 by virtue of the conical spring pressed plunger 17 which is depressed by a roller 18 carried by the lever 15, as will be understood. Mounted on the lever 15 is a pawl 19 pivoted at 20 in the ears extending from the lever 15. This pawl 19 bears at its free extremity against a wedge block 21 on the end of the valve stem 7 so that as the lever 15 is swung counter-clockwise the pawl 19 rides on the taper block 21 and pushes the valve stem 7 to the right to open the port P². When the lever 15 is swung quickly by the plunger 17 the pawl soon leaves the taper block 21 and the latter under the action of the spring 7' is thereupon enabled to swing the pawl counter-clockwise to permit the valve to close. Subsequently the lever 15 is restored to its position shown by Fig. 1; during which movement, the pawl is free to ride over the apex of the taper block 21 and ultimately return to the position shown by Fig. 1 when the parts are ready for the next operation. It will be seen that during the end of each forward stroke of the ram, a "shot" of oil under pressure is permitted to pass through the valve A and these shots become available for progressively feeding the work-carrier step by step. The tool T is mounted in the usual clapper box and is permitted thereby to ride over the top of the work during the return stroke of the ram R. If it be desired to suspend all automatic feeding, it is only necessary to shift the valve handle V²² to its neutral position shown by dotted lines in Fig. 1 whereupon the valve V²³ is closed against the passage of oil to the cylinder C'.

After the work has been planed by the tool T, the work-carrier may be very expeditiously returned to its initial position by shifting the valve handle V²² to its other extreme position (to reverse the flow through the pipes l and r) and then to open the valve M by actuating the handle M'. This permits the oil in the pressure line to flow from the pipe 23 and through the pipe 24 past the valve M and into the pipe 25 from which it is finally conveyed to the pipe 11 and caused to pass through the valve V²³ under full pressure and avoid the impediments of the needle valve N. The freely flowing oil will then, of course, accomplish a rapid movement of the work-carrier either to the right or to the left depending upon the position the direction valve V²³ has been set.

To avoid all of the complications due to gears and the like for performing the cutting operation between the work and the tool, and for performing the quick return movement relatively between the work and the tool, this invention proposes an automatic hydraulic actuation in the nature of a periodic to and fro movement, the advance being at a rate commensurate with the cutting capacity of the tool and the return being at a rate as quick as will be compatible with the momentum of the parts. This is exemplified by a cylinder Z secured to the main frame of the machine and containing a piston head Y carried by a piston rod Y' which projects through a packing-box at one end of the cylinder and is secured to an appropriate part of the reciprocatable carrier R, such as the web R'. The forward or cutting stroke is accomplished by the passage of oil through an outlet pipe 30 and then through a leader 31 and finally through a pipe 32 into the rear end of the cylinder. The admittance of oil to the aforesaid piping is determined by a valve shown by Fig. 2. This valve comprises a casing 33 containing a tubular plunger 34, the position of which is determined by a plunger stem 35 which is operated automatically as will soon be explained. When the parts are in the position shown by Fig. 2 the oil under pressure from the pipe terminal P' enters the space 36 and then passes through the port 37 which is more or less closed (in accordance with the rate of advance desired) by a needle valve 38 having an external hand grasp 39 and screw threads 40 whereby it may be manually set into any position from the full opening indicated in dotted lines to the closed position shown in full lines on Fig. 2. Upon passing the restricted opening of the needle valve the oil flows into a passage 41 and then into a passage 42 and finally into the terminal pipe 30 from which, as previously explained, it enters the rear end of the cylinder. It will be perceived that so long as the tubular piston 34 is in the position shown by Fig. 2 the ram R will be advanced, the full pressure of the oil being available to cause the tool to cut the work but the rate at which the oil may flow being controlled by a hand grasp 39 of the needle valve so that the rate of advance of the cutting tool may be adjusted as desired. It will also be perceived that the adjustment can be very easily made and within very close limits so that the attendant by merely turning the hand grasp 39 can cause the tool to plow through the work at the maximum rate of speed permissible for the strength of the tool and for the finish desired for the cutting operation.

The means for discontinuing the advance at the end of the cutting stroke is in the nature of an automatic trip appliance actuated by dogs mounted on the tool-carrier. It has already been explained that the dog 12 will throw the lever 15 in a counter-clockwise direction during the advance of the ram R. This lever carries a slip collar 43 riding on the valve stem 35 and having a pin and slot connection with the lever 15. As the ram advances, this collar slides towards a stop collar 44 affixed to the valve stem 35 and finally impacts against it with a hammerlike action under the effect of the spring-pressed plunger 17 (previously explained) and this causes the valve stem 35 to be moved to the right and thus shift the tubular plunger 34 into the position shown by dotted lines. That plunger has a head 45 which, when moved to the right, closes the escape port 37 and it has another head 46 which will then open the way for the oil to flow through the space 36 and into the pipe 47 under full pressure. The pipe 47 leads, through a connecting pipe 48, to the front end of the cylinder Z so that the oil now flows freely into the front end of that cylinder under full pressure and causes the tool-carrier rapidly to retreat to the right. This movement continues until a second dog 50 on the ram impacts the extremity 14 of the trip leader and swings it clock-wise to restore it to its position shown by Fig. 1 and during that movement the slip collar 43 will impact a stop collar 51 secured to the valve stem 35 and quickly move the valve to the right and into the original position shown by Fig. 2 whereupon the retreat of the ram will be suspended and its slow forward advance will recommence.

Provision is made for permitting the oil in the forward end of the cylinder freely to escape to the reservoir during the slow advance cutting stroke of the tool-carrier and also for permitting the oil in the rear end of the cylinder Z to freely escape during the quick return or non-cutting stroke of the ram. In the former instance, the oil returns through the pipe 47 and enters the port 52 and the space 53 and then out through the drain pipe terminal E' and then through the drain pipe E and finally to the reservoir through the pipe $E^5$. When the valve is in the dotted line position, it represents the quick return stroke of the ram, the oil returns through the pipe 30 and into the passages 42 and 41 and then through the port 54 into the other end 55 of the cylinder and then through the bore 56 of the plunger 34 and out through the pipe terminal E'.

It will be perceived from the foregoing that, by this invention, all of the movements are accomplished without resorting to mechanical complications such as gears, transmissions, clutches and speed change mechanisms and that not only the adjustment in the relations between the work and the tool is accomplished hydraulically but also the tooling operation itself is performed hydraulically. Structurally speaking, the mechanism is compact, the cylinders admit of being nested with the carriers and, as to the tool-carrier, arranged to give a direct line thrust at the cutting operation so as to avoid all cramping tendencies and keep the frictional losses at a minimum. Furthermore, the construction admits being used in any factories where a central external source of fluid pressure may be piped to a plurality of different machines; thereby conserving power losses and enabling a single externally located pump to maintain in operation a number of different machines.

From the standpoint of the attendant, the control of the machine becomes very simple because by merely regulating the needle valve N he may with precision adjust the extent of the intermittent feed; it being noted that to prevent any over-feed, a spring pressed check-valve maintaining a predetermined back pressure may be inserted, as at the point G, in the exhaust line from valve $V^{23}$. As to the saddle, a manipulation of the valve V enables it to be readily raised and lowered without effort and by setting that valve in its neutral position the saddle is locked hydraulically against any movement. To stop the operation of the ram, it is only necessary to discontinue the flow of oil from the pressure line which, in its embodiment, can be done by throwing the lever L. In case it is desired to actuate the ram under manual control it is only necessary for the attendant to manipulate the lever 15.

Having thus revealed this invention, I claim as new and desire to secure the following combinations and elements, or equivalents thereof, by Letters Patent of the United States:—

1. A hydraulically operated machine tool combining a translatable work carrier; a translatable tool-carrier, said carriers each being movable rectilinearly perpendicular to the path of movement of the other; a hydraulic pump; a hydraulic motor connected with each of said carriers to effect their translatory movements; a conduit system connecting said pump with said hydraulic motors; valve mechanism for controlling the course and rate of flow of the fluid through said system and to said motors; valve operating mechanism; and dogs adjustably mounted on the tool-carrier for automatically manipulating said valve-operating mechanism to cause said tool-carrier to reciprocate slowly to and rapidly fro between the limits of movement determined by said dogs.

2. A hydraulically-operated machine tool comprising a translatable tool-carrier and a translatable work-carrier, a non-rotating tool carried by said tool-carrier; a piston adapted to advance one of said carries while the other is held stationary to enable the non-rotating tool to remove a strip of metal; a second piston for directly effecting a relative lateral displacement between said carriers; and an automatic fluid valve system for continually reciprocating the first piston slowly to and rapidly fro and for intermittently advancing said second piston for accomplishing a progressive lateral displacement between said two carriers to present fresh portions of the work successively to the action of the advancing tool.

3. A machine tool combining a tool-carrier; a work-carrier; a piston and cylinder for shifting one of said carriers; a source of fluid under pressure; a conduit system from said source to said cylinder comprising two branch lines, the first for conveying the fluid at a slow rate and having a valve therein automatically operated to intermittently open said line, and the second branch more rapidly than the first; a junction valve for admitting the fluid from either of said branch lines to the one or the other end of said cylinder to determine the direction of shifting of said carrier; and valve means for rendering one or the other of said branch lines operative to convey fluid to said junction valve.

4. A machine tool comprising a work-carrier; a tool-carrier; a piston and cylinder for shifting one of said carriers; a source of fluid under pressure; a conduit system connecting said source with said cylinder and comprising two branch lines; a needle valve in one of said branch lines for reducing the flow of fluid therethrough, the other of said branch lines being of larger capacity; automatically actuated means for intermittently opening said needle valve line to the flow of fluid to feed the corresponding carrier; valve means for determining which of said branch lines may convey fluid to said cylinder; and a reversing valve for determining which end of said cylinder shall receive said fluid.

5. A machine tool comprising a tool-carrier; a work-carrier; a piston and cylinder for shifting one of said carriers; a source of fluid pressure; a first conduit line deriving fluid from said source and adapted to convey said fluid at a slow rate to said cylinder to shift said carrier slowly; a first valve adapted to be operated periodically to cause predetermined amounts of fluid intermittently to flow through said first conduit; automatic means to actuate said valve in timed relation with the movement of the other carrier; a second conduit line deriving fluid from said source and adapted to convey it more freely to said cylinder to shift said carrier more rapidly; and valve means for controlling the flow of fluid through said second conduit lines to effect a rapid traverse of said carrier.

6. A machine tool combining a tool-carrier; a work-carrier; a piston and cylinder for shifting one of said carriers; a source of fluid under pressure; a conduit system from said source to said cylinder comprising two branch lines, the first for conveying the fluid at a slow rate and the second more freely than the first; a junction valve for admitting the fluid from either of said branch lines to the one or the other end of said cylinder to determine the direction of shifting of said carrier; a periodically-operated valve and automatic actuating means therefor operated in timed relation with the movement of the other carrier for momentarily controlling said first branch to effect an intermittent feed of said carrier; and a manually operated valve for controlling said second branch to effect a rapid traverse of said carrier.

7. A machine tool comprising a work-carrier; a tool-carrier; a piston and cylinder for shifting one of said carriers; a source of fluid under pressure; a conduit system connecting said source with said cylinder and comprising two branch lines; a needle valve in one of said branch lines for reducing the flow of fluid therethrough; an automatic valve actuated in timed relation with the movement of the other carrier for controlling the flow through the branch containing the needle valve; and a manual valve for the other branch.

8. A machine tool comprising a work-carrier; a tool-carrier; a piston and cylinder for shifting one of said carriers; a source of fluid under pressure; a conduit system connecting said source with said cylinder and comprising two branch lines; a needle valve in one of said branch lines for reducing the flow of fluid therethrough, the other of said branch lines being of larger capacity; an automatic valve in the branch line containing the needle valve, said valve being actuated in timed relation with the movement of the other carrier for periodically passing shots of fluid to progressively feed the corresponding carrier; a manual valve for selectively opening said other line to permit flow of fluid therethrough to said cylinder; and a reversing valve for determining which end of said cylinder shall receive said fluid.

9. A shaping machine combining a reciprocating ram; a translatable work table; a hydraulic motor connected with said work table for giving to said table its feeding movements; a hydraulic pressure line; a branch line connected to one end of said hydraulic motor; a valve connecting said pressure line with said branch line; and means actuated by said ram in each of its retracting movements momentarily to open said valve to permit shots of fluid to pass from said pressure line to the branch line and to said motor thereby to produce a succession of feeding movements of said table in a single direction.

10. A shaping machine combining a reciprocating ram; a translatable work-table; a hydraulic motor connected with said work table for giving to said table its feeding movements; a hydraulic pressure line; a branch line connected to one end of said hydraulic motor; a spring controlled valve connecting said pressure line with said branch line; and automatic means actuated in timed relation with the retraction of said ram momentarily to open said valve to permit shots of fluid to pass from said pressure line to the branch line and to said motor thereby to produce a succession of feeding movements of said table in a single direction.

11. A source of fluid under pressure; a tool-carrier; a work-carrier; a first piston for effecting a reciprocation of one of said carriers; a second piston for effecting a relative movement between said carriers transversely to the direction of said reciprocation; carrier-operated valve-means for alternately admitting fluid slowly to the rear of said first piston and rapidly to its front; and automatic valve-means for intermittently admitting shots of fluid to said second piston to progressively advance it and thereby cause relative feed between said carriers.

12. A machine tool comprising a work carrier; a tool carrier; a piston and cylinder for shifting one of said carriers; a source of fluid under pressure; a conduit system connecting said source with said cylinder comprising two branch lines, one of said lines connectable with said source for conducting fluid continuously to said cylinder and the other of said branch lines connectible to convey fluid intermittently to said cylinder; automatically operated means associated with said other branch line for intermittently opening said line to the flow of fluid for a predetermined period to cause said intermittent flow; valve means for determining which of said branch lines may convey fluid to said cylinder to shift the associated carrier in accordance with the branch line which is effective; and valve means for determining to which end of said cylinder the fluid is conveyed.

13. A hydraulically operated machine tool of the shaper or planer type combining a translatable tool carrier; a non-rotary type tool carried thereby; a translatable work carrier, said carriers being translatable rectilinearly in planes which are perpendicular to each other; a hydraulic pump; a hydraulic motor for operating each of said carriers; fluid connections and control mechanism for governing the course and rate of flow of fluid to said motors from said pump; dogs adjustably mounted on one of said carriers for automatically operating said control mechanism to effect a slowly to and rapidly fro movement of the corresponding carrier between the limits of movement determined by said dogs; and means operated by the movements of said last named carrier to control the fluid to the motor for the other carrier to effect a step by step transverse movement thereof.

In witness whereof, I have hereunto subscribed my name.

ROBERT M. GALLOWAY.